United States Patent
Csutak

(10) Patent No.: US 9,395,465 B2
(45) Date of Patent: Jul. 19, 2016

(54) GRAVITY AND/OR ACCELERATION MEASUREMENTS USING DUAL INTEROMETER CONFIGURATIONS

(71) Applicant: Sebastian Csutak, Houston, TX (US)

(72) Inventor: Sebastian Csutak, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/448,542

(22) Filed: Jul. 31, 2014

(65) Prior Publication Data

US 2016/0033675 A1 Feb. 4, 2016

(51) Int. Cl.
*G01B 11/02* (2006.01)
*G01V 7/04* (2006.01)

(52) U.S. Cl.
CPC .................................. *G01V 7/04* (2013.01)

(58) Field of Classification Search
CPC ............................ G01B 9/02027; G01C 19/00
USPC .......................................... 356/486, 493, 498
See application file for complete search history.

(56) References Cited

U.S. PATENT DOCUMENTS

| | | | |
|---|---|---|---|
| 6,018,390 A | 1/2000 | Youmans et al. | |
| 6,322,037 B1 | 11/2001 | Nanko et al. | |
| 6,650,418 B2 | 11/2003 | Tweedy et al. | |
| 6,886,404 B2 | 5/2005 | Digonnet et al. | |
| 7,222,534 B2 | 5/2007 | Maas et al. | |
| 7,528,961 B2 | 5/2009 | Hill | |
| 7,764,384 B1 | 7/2010 | Zhao | |
| 7,808,618 B1 | 10/2010 | Tawney et al. | |
| 7,880,890 B2 | 2/2011 | Reyes et al. | |
| 8,387,456 B2 | 3/2013 | Carr | |
| 8,537,365 B1 | 9/2013 | Korman et al. | |
| 2006/0130575 A1* | 6/2006 | Niebauer .................. | G01V 7/14 73/382 R |
| 2008/0080034 A1 | 4/2008 | Saadany et al. | |
| 2009/0235740 A1* | 9/2009 | Carr .......................... | G01V 7/00 73/382 R |

(Continued)

FOREIGN PATENT DOCUMENTS

WO 2010040997 A1 4/2010
WO 2013166407 A1 11/2013

OTHER PUBLICATIONS

Acernese, Dott. Fausto, "An Interferometric seismic sensor: theoretical model and experimental performances", Univ. di Napoli, 2005, available online at http://www.fedoa.unina.it/101/1/TesiAcemese.pdf, 112 pages.

(Continued)

*Primary Examiner* — Jonathan Hansen
(74) *Attorney, Agent, or Firm* — Cantor Colburn LLP

(57) ABSTRACT

An apparatus for estimating gravitational properties includes an optical source, a first interferometer including a fixed reference reflector and a first reflector coupled to a first moveable mass, a second interferometer including the fixed reference reflector and a second reflector coupled to a second moveable mass, a first detector configured to detect a first interference pattern generated by the first interferometer, and a second detector configured to detect a second interference pattern generated by the second interferometer. The first mass is configured to move a first amount in response to a change in gravitational force, and the second mass is configured to move a second amount in response to a change in gravitational force, the second amount being smaller than the first amount. The apparatus also includes a processor configured to estimate the change in gravitational force based on a combination of the first and second interference patterns.

20 Claims, 3 Drawing Sheets

(56) References Cited

U.S. PATENT DOCUMENTS

| | | |
|---|---|---|
| 2010/0302550 A1 | 12/2010 | Hacker et al. |
| 2011/0176138 A1 | 7/2011 | Khalil et al. |
| 2012/0059620 A1 | 3/2012 | Lee et al. |
| 2012/0120404 A1 | 5/2012 | Coffin |
| 2014/0022546 A1 | 1/2014 | Nagai et al. |
| 2014/0026654 A1 | 1/2014 | Klopping et al. |
| 2014/0083186 A1* | 3/2014 | Levitt .................. G01V 7/00 73/382 R |

OTHER PUBLICATIONS

Dubrov, et al.; "Precise laser interferometry with 1 pm resolution"; Institute of Radioengineering and Electronics, Russian Academy of Sciences; May 5, 2004; 11 pages.

Niebauer, et al., "A new generation of absolute gravimeters", Metrologia, 1995, 32, pp. 159-180.

Notification of Transmittal of the International Search Report and the Written Opinion of the International Searching Authority, or the Declaration; PCT/US2015-021161; Mail date: Jun. 23, 2015; 13 pages.

Pitkin, et al.; "Gravitational Wave Detection by Interferometry (Ground and Space)", Living Rev. Relativity, 14, (2011), 75 pages; http://www.livingreviews.org/lrr-2011-5.

Rothleitner, "Ultra-high Precision, Absolute, Earth Gravity Measurements", University Erlangen-Nuremberg, Germany, 2008, available online at http://opus4.kobv.de/opus4-fau/frontdoor/index/index/docId/658, 160 pages.

Saulson, "Gravitational wave detection: Principles and practice", C. R. Physique 14 (2013) pp. 288-305, www.sciencedirect.com.

* cited by examiner

GRAVITY AND/OR ACCELERATION MEASUREMENTS USING DUAL INTERFEROMETER CONFIGURATIONS

BACKGROUND

In exploration for hydrocarbons, knowledge of properties of earth formations is important for being able to locate and characterize reservoirs of oil and gas. Measuring properties of earth formations, such as the location and properties of various structures, allows for the identification of such reservoirs, their potential for hydrocarbon production, and optimization of production techniques.

Gravitational measurement is one technique used for geophysical exploration. Precise gravity surveys allow a measurement of anomalies of the subsurface density introduced by certain geological structure (e.g. salt domes, faults, iron ore deposits, etc.). Gravitational surveying is used for purposes such as oil exploration, mineral exploration and oil and gas reservoir monitoring.

SUMMARY

An apparatus for estimating gravitational properties includes an optical source configured to emit electromagnetic radiation, a first interferometer including a fixed reference reflector and a first reflector coupled to a first moveable mass, a second interferometer including the fixed reference reflector and a second reflector coupled to a second moveable mass, a first detector configured to detect a first interference pattern generated by the first interferometer, and a second detector configured to detect a second interference pattern generated by the second interferometer. The first mass is configured to move a first amount in response to a change in gravitational force, and the second mass is configured to move a second amount in response to a change in gravitational force, the second amount being smaller than the first amount. The apparatus also includes a processor configured to estimate the change in gravitational force based on a combination of the first and second interference patterns.

A method of estimating gravitational properties includes emitting an electromagnetic radiation beam from an optical source, transmitting the beam to a fixed reflector, directing a portion of the beam to a first interferometer including the fixed reflector and a first reflector coupled to a first moveable mass, directing another portion of the beam to a second interferometer including the fixed reflector and a second reflector coupled to a second moveable mass, detecting a first interference pattern generated by the first interferometer, detecting a second interference pattern generated by the second interferometer, and estimating the change in gravitational force based on a combination of the first and second interference patterns. The first mass is configured to move a first amount in response to a change in gravitational force, and the second mass is configured to move a second amount in response to a change in gravitational force, the second amount being smaller than the first amount.

BRIEF DESCRIPTION OF THE DRAWINGS

The following descriptions should not be considered limiting in any way. With reference to the accompanying drawings, like elements are numbered alike.

DETAILED DESCRIPTION

There are provided systems, apparatuses and methods for measurements using optical interferometers. An embodiment of an interferometer assembly includes a dual interferometer configuration, which may be used to measure properties or parameters such as acceleration and gravitational force. The dual interferometer configuration includes at least two interferometers coupled to a single optical source and having different but overlapping dynamic ranges. In one embodiment, each interferometer includes a moveable reflector, such as a mirror attached to a moveable mass. A first moveable reflector is configured to move a first amount in response to a gravitational or other force, and a second moveable reflector is configured to move a second different amount in response to the force. For example, the first moveable reflector is coupled to a coarse spring and the second moveable reflector is coupled to a fine spring that is stiffer than the coarse spring.

Figure 1:
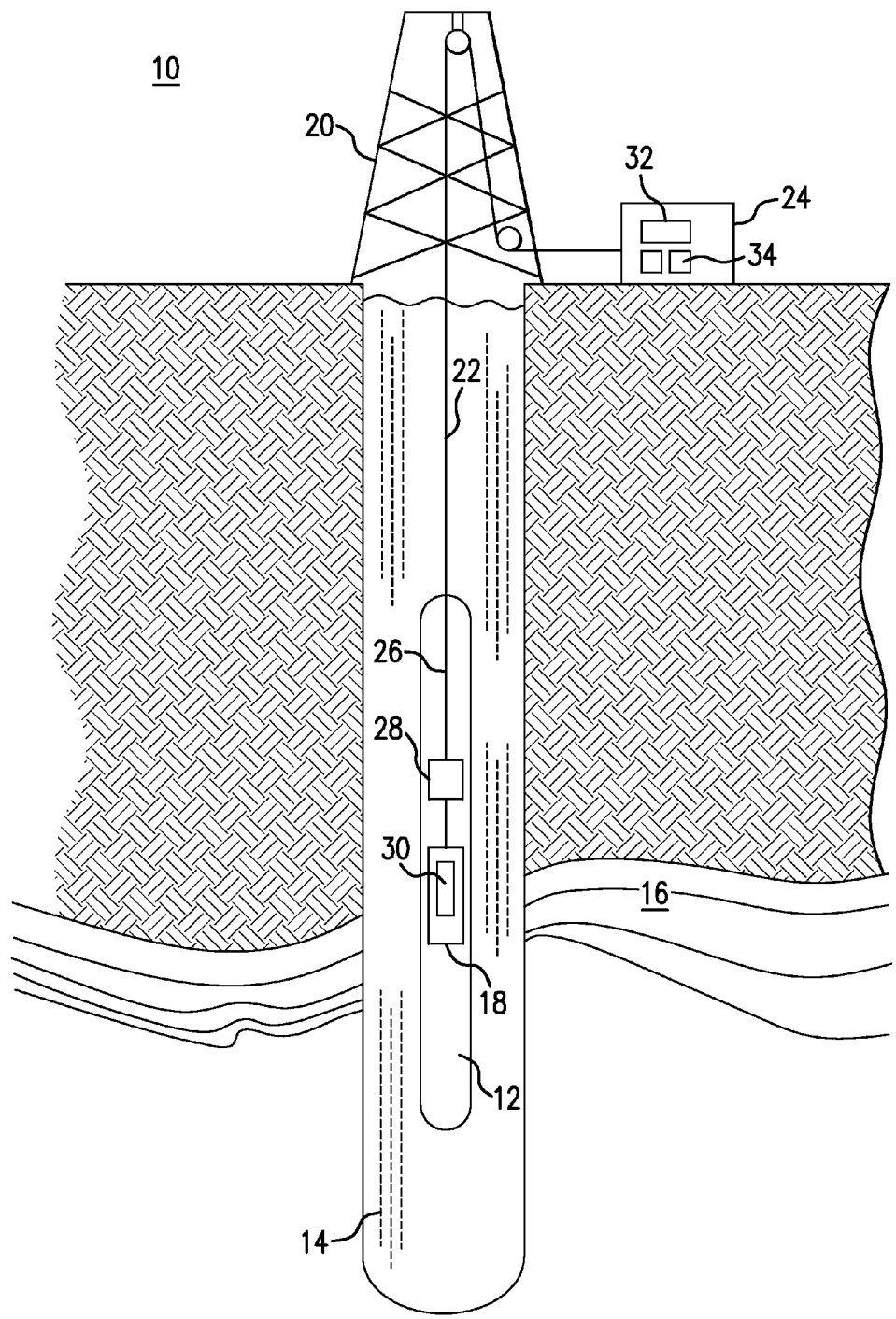
FIG. 1 depicts an exemplary embodiment of a formation measurement system.

Referring to FIG. 1, an exemplary embodiment of a downhole measurement system 10 includes one or more measurement tools 12 disposed in a borehole 14 in an earth formation 16. At least one of the measurement tools 12 includes one or more gravitational sensors or gravimeters 18 for measuring the gravitational field at various locations in the formation. In this embodiment, a gravimeter 18 is incorporated in a wireline tool 12 connected to a wellhead 20 via a wireline 22. In other embodiments, one or more gravimeters can be located or arrayed at the surface. Other embodiments for which the gravimeter 18 can be used include logging-while-drilling, production logging, and borehole, production and/or completion monitoring. The gravimeter may be incorporated into a moveable carrier, or incorporated into casing, cement or other components for permanent or semi-permanent installation.

The tool 12 and gravimeter 18 are not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include wirelines, wireline sondes, slickline sondes, drop shots, downhole subs, bottom-hole assemblies, and drill strings.

Gravimeters are configured to measure the acceleration due to gravity, which is equal to the gradient of the gravitational potential energy. Gravimeters may include absolute gravimeters and relative gravimeters that are used in conjunction with one or more reference gravimeters located remotely from each relative gravimeter.

Gravity surveys or other operations that include gravity measurements can be employed to facilitate estimates of various properties of the earth formation. For example, borehole gravity measurements may be used to detect density parameters along the borehole, which can be used to estimate overburden pressure, porosity changes, lithology, fluid saturation and others. In addition, gravimeters can be utilized to measure acceleration, pressure, deformation, seismic or microseismic signals, and be used for navigation. Other uses include completion monitoring (e.g., permanent or semi-permanent monitoring), cased or open hole production logging, and permanent monitoring applications.

In one embodiment, the tool 12 and/or other downhole components are equipped with transmission equipment to communicate ultimately to a surface processing unit 24. Such transmission equipment may take any desired form, and different transmission media and methods may be used, such as wired, fiber optic, and wireless transmission methods. For example, the surface processing unit 24 is connected to the tool 12 and/or gravimeter 18 via a communication line or cable 26, which may include optical fibers and/or electrical conductors. The cable 26 can transmit command and control signals to control the tool and/or gravimeter. The cable 26 may also have other functions, including transmitting data to the surface and providing power to the tool 12 and/or other components.

Additional processing units may be disposed with the carrier. For example, a downhole electronics unit 28 includes various electronic components to facilitate receiving signals and data, transmitting data, and/or processing data downhole. The surface processing unit 24, downhole electronics unit 28, the tool 12 and/or other components of the system 10 include devices as necessary to provide for storing and/or processing data. Exemplary devices include, without limitation, at least one processor, storage, memory, input devices, output devices and the like.

In one embodiment, the gravimeter 18 includes an optical interferometer assembly 30 coupled to a light source 32 such as a tunable laser. Detectors 34 are configured to receive return signals as interferometric patterns produced by the interferometer assembly 30. The light source 32 may be located at the surface, e.g., at the surface processing unit 24 or interrogator unit as shown in FIG. 1, or may be located downhole and controlled by, e.g., the surface processing unit 24 and/or downhole electronics unit 28. Likewise, the detectors may be located at the surface and coupled to the interferometer assembly 30 by optical fibers, or may be located downhole, e.g., as part of the interferometer assembly 30.

The interferometer assembly is configured as a high resolution, dynamic range sensor that includes dual interferometers, such as dual Fabry-Perot (FP) or Michelson interferometers. The sensor may be used for various purposes, including measuring gravity, acceleration, pressure, deformation, seismic or acoustic properties, and any other properties or phenomena that can be measured using optical interferometry.

In one embodiment, the interferometer assembly is configured as a high resolution accelerometer/gravimeter capable of measuring gravitational acceleration at a high resolution, e.g., 1 part per billion. Gravitation acceleration is typically measured using the unit "g", which is the acceleration due to gravity at the earth's surface, defined as 9.80665 m/s2.

Using a single optical source, a 1 part-per-billion (ppb) of "g" resolution accelerometer/gravimeter requires that the optical source frequency needs to be known with 0.1 ppb resolution. Typical approaches to optical interferometers have drawbacks that include difficulty in attaining a sufficient dynamic range and resolution. For example, in a Fabry-Perot type accelerometer, the transfer function of the FP interferometer has a nonlinear shape and portions where the FP optical cavity has low sensitivity to input acceleration (sensitivity gaps in the free spectral range), which limits the dynamic range of the accelerometer. To circumvent this limitation, a multiangle beam solution has been proposed to achieve a dynamic range of about +/−1 g. Alternatively, a Michelson interferometer (MI) can offer the resolution and the dynamic range of a FP interferometer, while having a transfer function that does not have the above sensitivity gaps.

An embodiment of an interferometer is referred to herein as a dual interferometer. The dual interferometer includes one or more light sources coupled to two or more independently movable reflectors (e.g., mirrors or plates) and a fixed reference reflector. An interferogram is produced by interference between signals reflected from one of the moveable reflectors and the reference reflector, thus producing a separate interferogram for each moveable reflector. A detector is provided for each moveable reflector. In one embodiment, a single light source such as a tunable laser is coupled to the reference and moveable reflectors so that a single beam is used to create two separate interferograms. Although embodiments herein describe two moveable reflectors and associated interferometers, they are not so limited. Interferometer assemblies described herein may include any number of interferometers (e.g., three or more) to cover various dynamic ranges.

The reference reflector is disposed in a fixed relationship to the light source, so that the optical path from the light source to the reference reflector is at least substantially constant. Each moveable reflector is coupled to a mass such as a proof mass by an elastic body such as a spring, so that displacement or deflection of each moveable reflector in response to an acceleration is different. For example, a first moveable reflector is attached to a first spring that is designed to have a larger deflection in response to acceleration (caused by, e.g., a change in the gravitational field and corresponding change in weight of the mass), and a second moveable reflector is designed to have a smaller deflection. In this way, the assembly defines at least two interferometers coupled to a single light source, each interferometer having a different dynamic range. For example, the first interferometer including the first (coarser) spring has a dynamic range from about 1 g to 1 ug, and the second interferometer including the second (finer) spring has a dynamic range from about 1 mg to 1 ng.

Each spring is selected or adjusted to have a selected tension, which results in corresponding displacement or movement in response to a change in the gravitational field. The springs may be installed in the interferometer assembly having a pre-defined tension and/or may include adjustment means (e.g., an adjusting screw) to adjust the tension to correspond to a selected dynamic range.

Figure 2:
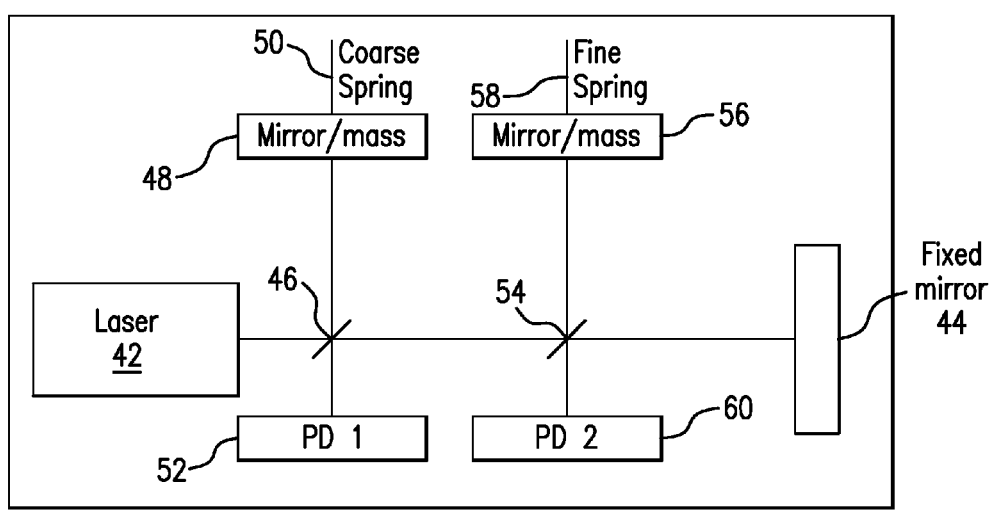
FIG. 2 depicts an exemplary embodiment of a dual interferometer assembly for measuring parameters such as gravitation parameters.

FIG. 2 illustrates an example of a dual interferometer assembly 40. The dual interferometer can be incorporated in a downhole system, e.g., the tool 12, or disposed on the surface. In this example, the dual interferometer assembly 40 includes Michelson interferometers, although other interferometers configurations can be used, such as Fabry-Perot interferometers.

The assembly 40 includes a light source 42 such as a tunable laser. The tunable laser may be configured to emit optical signals having a selected wavelength, such as those at or around the 1.55 or 1.31 micron standards. The light source 42 is coupled to a reference reflector such as a fixed mirror 44. A first beam splitter 46 divides an optical signal emitted by the light source and a portion of the signal toward a first mirror 48 that is attached to a mass. The mass is connected to a coarse or soft spring 50, i.e., a spring having a higher displacement in response to acceleration or movement. Light reflected from the first mirror 48 interferes with light reflected from the fixed mirror 44, generating an interferometric pattern detected by a first detector 52.

The beam splitter 46 allows a selected portion of the optical signal (e.g., part of the intensity) to continue to a second beam splitter 54, which again divides the remaining optical signal and directs light to a second mirror 56 attached to a mass, which is coupled to a fine or stiff spring 58, i.e., a spring having a lower displacement than the coarse spring 50. Light reflected from the second mirror 56 interferes with light reflected from the fixed mirror 44, generating another interferometric pattern detected by a second detector 60.

The first mirror 48, in combination with the light source 42 and the fixed mirror 44, forms a first interferometer that has a first dynamic range (e.g., on the order of g to μg). The second mirror 56, in combination with the light source 42 and the fixed mirror 44, forms a second interferometer having a second dynamic range (e.g., on the order to nano-g to milli-g) that is different from and overlaps the first dynamic range. In this way, a relatively large dynamic range (e.g., on the order of g to nano-g) can be achieved without the difficulty and complexity required to design a single interferometer that achieves such a range.

Figure 3:
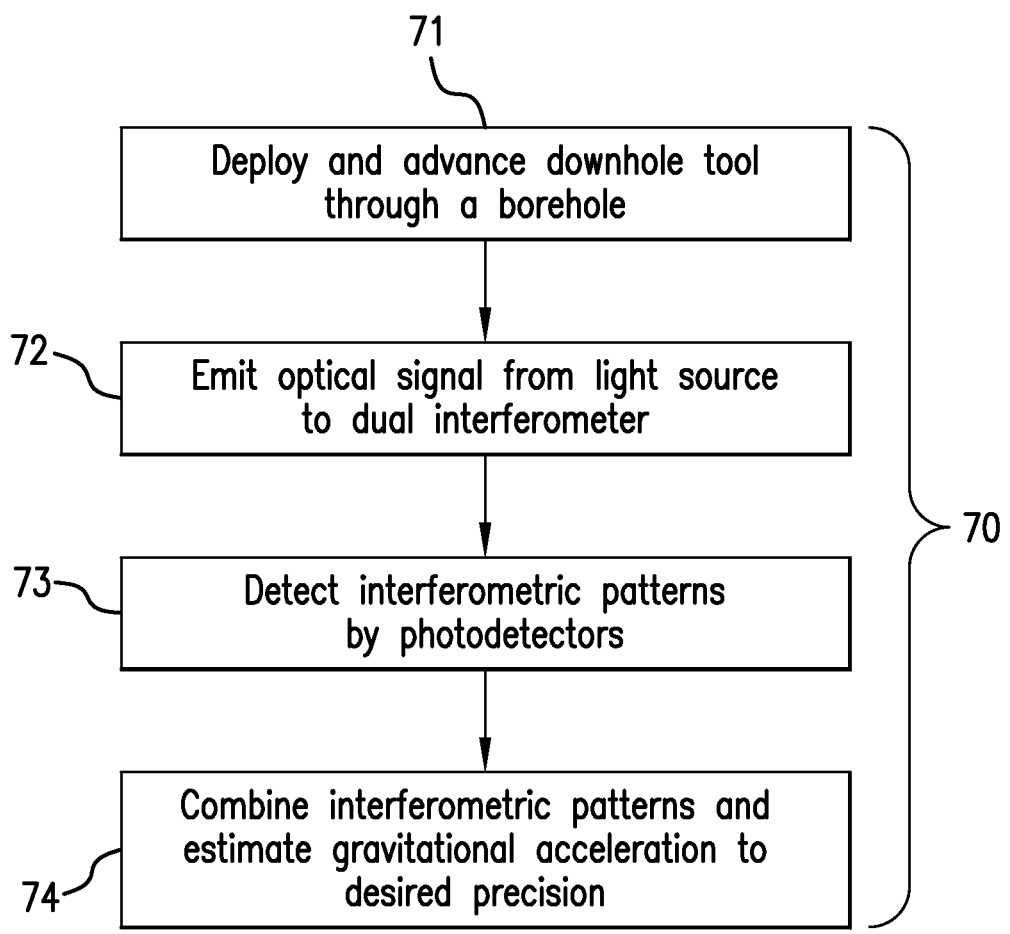
FIG. 3 is a flow chart providing an exemplary method for measuring changes in gravitational force.

FIG. 3 illustrates a method 70 for performing measurements using optical interferometry, such as acceleration and gravitational measurements. The method 70 includes one or more stages 71-74. The method 70 is described herein in conjunction with the system 10 and interferometer assembly 40, although the method 70 may be performed in conjunction with any number and configuration of measurement devices configured to measure gravitational acceleration or other parameters using dual interferometers as described herein. In one embodiment, the method 70 includes the execution of all of stages 71-74 in the order described. However, certain stages may be omitted, stages may be added, or the order of the stages changed.

In the first stage 71, at least one measurement tool is deployed at a measurement location. In one embodiment, the tool is disposed in a borehole and advanced through the borehole via a wireline or other carrier. For example, the tool 12 is disposed in the borehole 14 using a wireline 22. Although the stages described herein are described in the context of a downhole gravitational survey, they are not so limited. The method 70 can be applied to surface gravitational measurements. In addition, the method 70 may be used to measure other parameters or formation properties, such as acoustic or seismic properties, displacement or deformation of downhole components, vibration and pressure.

The measurement tool includes an interferometer assembly that has a dual interferometer configuration. For example, the interferometer assembly 40 is included in the tool 12, which in this example as a dual Michelson interferometer. A single light source is used to apply optical signals to a reference reflector and the dual moveable reflectors in the assembly. For example, the interferometer assembly is the assembly 40, which includes moveable mirrors 48 and 56, coupled to springs 50 and 58, respectively. In this example, the springs are parallel, i.e., extend along parallel or substantially parallel axes.

In one embodiment, the interferometer assembly includes a first interferometer having a dynamic range from about 1 g to 1 micro-g, and a second interferometer having a dynamic range from about 1 milli-g (mg) to 1 nano-g (ng). Both interferometers are coupled to the same source, such as a tunable laser. The first interferometer includes a moveable reflector or mirror coupled to a spring that is designed to have a large deflection/g (a coarse spring) and the second interferometer includes a moveable reflector or mirror coupled to a spring designed to have a smaller deflection/g (a fine or relatively stiff spring).

In the second stage 72, optical signals from a light source are directed to the moveable reflectors and reference reflector. In one embodiment, a single source emits a signal, which is split twice to direct beams to the moveable reflectors. An exemplary light source is a tunable laser configured to emit selected wavelengths (e.g., 1.55 or 1.3 microns) with a narrow linewidth. For example, the laser has a line width ($\Delta\lambda$) of less than about 2 MHz, with a wavelength lock of about 20 kHz for 0.1 ppb resolution. Because the optical source is the same for both interferometers, the temperature and pressure are the same for control requirements. Phase modulation could be used for sampling or sensitivity increase.

In the third stage 73, interferometric patterns generated by the dual interferometers are generated and detected. A first interferogram is detected from the first moveable mirror, and a second interferogram is detected from the second moveable mirror. Any suitable photodetector may be used.

In the fourth stage 74, the detected interferograms are combined to generate a high resolution gravitational field change value. In one embodiment, a first interferogram is generated by the moveable mirror coupled to the coarse spring, from which from which a gravity value having 3-4 significant digits is obtained, i.e., 1 g to 1 μg. The gravity value is refined using a second value obtained from the second interferogram (having a dynamic range of 1 ng to 1 mg) to generate a final value having nine significant digits, i.e., having a precision on the order of nano-g.

The systems and methods described herein provide various advantages over existing processing methods and devices. For example, interferometer assemblies described herein provide gravitational and other measurements having sufficient range and sensitivity without requiring complex configurations (e.g., multi-beam angles) or costly and technically challenging optical sources (e.g., femtosecond lasers).

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating gravitational properties, comprising:
   an optical source configured to emit electromagnetic radiation;
   a first interferometer including a fixed reference reflector and a first reflector coupled to a first moveable mass, the first mass configured to move a first amount in response to a change in gravitational force;
   a second interferometer including the fixed reference reflector and a second reflector coupled to a second moveable mass, the second mass configured to move a second amount in response to a change in gravitational force, the second amount being smaller than the first amount;
   a first detector configured to detect a first interference pattern generated by the first interferometer;
   a second detector configured to detect a second interference pattern generated by the second interferometer; and
   a processor configured to estimate the change in gravitational force based on a combination of the first and second interference patterns.

2. The apparatus of claim 1, wherein the first moveable mass has a stiffness that is less than a stiffness of the second moveable mass.

3. The apparatus of claim 2, wherein the first moveable mass includes a first spring and the second moveable mass includes a second spring.

4. The apparatus of claim 1, wherein the first and second moveable masses are configured to move in at least substantially parallel directions.

5. The apparatus of claim 4, wherein the first and second interferometers are Michelson interferometers.

6. The apparatus of claim 1, wherein the first interferometer and the second interferometer have different, overlapping dynamic ranges.

7. The apparatus of claim 6, wherein the first interferometer has a dynamic range on the order of one g to one μg, and the second interferometer has a dynamic range on the order of one micro-g to one nano-g, wherein g is the acceleration of gravity at the earth's surface.

8. The apparatus of claim 7, wherein the processor is configured to calculate the change in gravitational force to a precision on the order of one nano-g.

9. The apparatus of claim 6, wherein the processor is configured to estimate a value of the change in gravitational force to a coarse resolution based on the first interference pattern, and refine the value to a fine resolution based on the second interference pattern.

10. The apparatus of claim 1, further comprising a first beam splitter configured to direct a portion of a beam emitted by the light source to the first reflector, and a second beam splitter configured to direct another portion of the beam to the second reflector.

11. A method of estimating gravitational properties, comprising:
   emitting an electromagnetic radiation beam from an optical source;
   transmitting the beam to a fixed reflector;
   directing a portion of the beam to a first interferometer including the fixed reflector and a first reflector coupled to a first moveable mass, the first mass configured to move a first amount in response to a change in gravitational force;
   directing another portion of the beam to a second interferometer including the fixed reflector and a second reflector coupled to a second moveable mass, the second mass configured to move a second amount in response to a change in gravitational force, the second amount being smaller than the first amount;
   detecting a first interference pattern generated by the first interferometer;
   detecting a second interference pattern generated by the second interferometer; and
   estimating the change in gravitational force based on a combination of the first and second interference patterns.

12. The method of claim 11, wherein the first moveable mass has a stiffness that is less than a stiffness of the second moveable mass.

13. The method of claim 12, wherein the first moveable mass includes a first spring and the second moveable mass includes a second spring.

14. The method of claim 1, wherein the first and second moveable masses are configured to move in at least substantially parallel directions.

15. The method of claim 11, wherein the first and second interferometers are Michelson interferometers.

16. The method of claim 11, wherein the first interferometer and the second interferometer have different, overlapping dynamic ranges.

17. The method of claim 16, wherein the first interferometer has a dynamic range on the order of one g to one μg, and the second interferometer has a dynamic range on the order of one micro-g to one nano-g, wherein g is the acceleration of gravity at the earth's surface.

18. The method of claim 17, wherein estimating the change in gravitational force includes calculating the change in gravitational force to a precision on the order of one nano-g.

19. The method of claim 16, wherein estimating the change in gravitational force includes calculating a value of the change in gravitational force to a coarse resolution based on the first interference pattern, and refining the value to a fine resolution based on the second interference pattern.

20. The method of claim 11, wherein the optical source, the first interferometer and the second interferometer are disposed in a downhole tool, and the method includes deploying the downhole tool in a borehole in an earth formation.

* * * * *